US009868365B2

United States Patent
Hourtane

(10) Patent No.: US 9,868,365 B2
(45) Date of Patent: Jan. 16, 2018

(54) GROUND LEVEL POWER SUPPLY SYSTEM FOR A NON-GUIDED VEHICLE

(71) Applicant: ALSTOM TRANSPORT TECHNOLOGIES, Levallois-Perret (FR)

(72) Inventor: Jean-Luc Hourtane, Bouc Bel Air (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 393 days.

(21) Appl. No.: 14/667,838

(22) Filed: Mar. 25, 2015

(65) Prior Publication Data
US 2015/0274035 A1    Oct. 1, 2015

(30) Foreign Application Priority Data

Mar. 25, 2014    (FR) ..................................... 14 52527

(51) Int. Cl.
*B60M 1/30*    (2006.01)
*B60M 1/36*    (2006.01)
(Continued)

(52) U.S. Cl.
CPC ............... *B60M 1/30* (2013.01); *B60M 1/10* (2013.01); *B60M 1/34* (2013.01); *B60M 1/36* (2013.01); *B60M 7/00* (2013.01)

(58) Field of Classification Search
CPC . B60M 1/00; B60M 1/30; B60M 1/34; B60M 1/36
(Continued)

(56) References Cited

U.S. PATENT DOCUMENTS 748,872 A * 1/1904 Lowrie ..................... B60M 1/00
                                                            191/19
771,785 A * 10/1904 Lowrie ..................... B60M 1/00
                                                            191/19
(Continued)

FOREIGN PATENT DOCUMENTS

EP    1582396 A1    10/2005
EP    2298588 A1    3/2011

OTHER PUBLICATIONS

Altmann M et al., Voltages and Over Voltages in the Return Circuit of DC Traction Systems, Elektrische Bahnen, Oldenbourg Industrieverlag, Munchen, vol. 104, No. 3, Mar. 1, 2006.
(Continued)

*Primary Examiner* — Zachary L Kuhfuss
(74) *Attorney, Agent, or Firm* — Eric L. Lane; Green Patent Law

(57) ABSTRACT

The inventive system, of the conduction type, comprises: a pair of power supply tracks, comprising a so-called live conductive track (11), designed to be electrically connected to a voltage source, and a so-called neutral conductive track (12), for the current return, designed to be electrically connected to a reference potential ($V_{ref}$), the neutral track traveling parallel to the live track on a first side thereof; and a protective conductive track (13), designed to be connected to a ground potential, the protective track traveling parallel to the live track (11) on a second side thereof, opposite the first side. The system is installed in a roadway such that the live, neutral and protective conductive tracks are flush with a surface (18) of the roadway (2).

11 Claims, 3 Drawing Sheets

(51) Int. Cl.
*B60M 7/00* (2006.01)
*B60M 1/10* (2006.01)
*B60M 1/34* (2006.01)

(58) Field of Classification Search
USPC .......................................................... 191/6
See application file for complete search history.

(56) References Cited

U.S. PATENT DOCUMENTS

| | | | | | |
|---|---|---|---|---|---|
| 3,637,956 | A | * | 1/1972 | Blackman | B60M 1/30 174/117 A |
| 4,139,071 | A | | 2/1979 | Tackett | |
| 4,476,947 | A | * | 10/1984 | Rynbrandt | B60L 9/00 180/2.1 |
| 5,134,254 | A | | 7/1992 | Musachio | |
| 5,464,082 | A | * | 11/1995 | Young | B60L 5/18 191/2 |
| 6,250,442 | B1 | * | 6/2001 | Perraud | B60M 1/08 191/1 R |
| 6,427,816 | B1 | * | 8/2002 | Siciliano | B60M 1/103 191/18 |
| 6,471,020 | B1 | * | 10/2002 | Hernandez | B60L 11/1816 191/2 |
| 2011/0017531 | A1 | * | 1/2011 | Re Fiorentin | B60L 5/42 180/65.1 |
| 2013/0037367 | A1 | * | 2/2013 | Aguilar | B60L 5/36 191/22 C |
| 2015/0224999 | A1 | * | 8/2015 | Duprat | B61B 9/00 238/14.3 |
| 2015/0274034 | A1 | * | 10/2015 | Hourtane | B60L 5/39 191/6 |
| 2015/0343921 | A1 | * | 12/2015 | Siciliano | B60M 1/106 191/10 |

OTHER PUBLICATIONS

Preliminary Search Report dated Nov. 19, 2014 in related French Patent Application No. 14 52527.

* cited by examiner ately connected to the ground.

In order to capture electricity from that ground level power supply system, the non-guided electric vehicle is provided with a pole, the end of which can penetrate the grooves of the roadway so as to come into electrical contact with the power supply rails. When the power supply rails are respectively brought to suitable potentials, electricity is transmitted to the battery of the vehicle or optionally directly to its electric engine.

However, such grooves are a source of driving issues.

A narrow wheel risks becoming jammed inside such a groove. This is in particular the case for bicycle wheels.

Furthermore, there is a significant loss of adherence when the tire of a vehicle passes over the portion of the roadway where the grooves emerge.

Lastly, the rims of these grooves cause accelerated wear of the tires.

Furthermore, the fact that the grooves are open leads to rainwater accumulation in the grooves.

This poses electrical contact problems for the conductive rails.

This also results in accelerated corrosion of the conductive rails. The rails may also become covered with a layer of rust, which hinders contact with the end of the electricity collecting pole.

The invention aims to propose a ground level power supply system for non-guided electric vehicles.

SUMMARY

The invention therefore relates to a ground level power supply system for non-guided electric vehicles, of the type using conduction, characterized in that it comprises:

a pair of power supply tracks, comprising a so-called live conductive track, designed to be electrically connected to a voltage source, and a so-called neutral conductive track, for the return of the current, designed to be electrically connected to a reference potential, the neutral track traveling parallel to the live track on a first side thereof; and a protective conductive track, designed to be connected to a ground potential, the protective track traveling parallel to the live track on the second side thereof, opposite the first side, said system being designed to be installed in the roadway such that the live, neutral and protective conductive tracks are flush with a surface of the roadway.

According to specific embodiments, the system includes one or more of the following features, considered alone or according to all technically possible combinations:

the protective conductive track is electrically connected to a wire designed to be buried in the roadway, so as to place said protective conductive track at the ground potential.

the live conductive track is made up of a plurality of elongated segments, arranged and end to end and electrically isolated from one another.

each segment is electrically connected to an electricity source (35) by a controlled switch.

the protective conductive track is made up of an upper surface of a profile (14) sealed in the roadway.

the neutral conductive track is made up of a plurality of elongated segments, positioned end to end, and electrically connected to the reference potential $V_{ref}$.

the live, neutral and protective conductive tracks are supported on a support assembly, designed to be embedded below the surface of the roadway.

the protective conductive track is at a distance from the live conductive track between 5 and 50 cm, preferably between 10 and 30 cm, in particular equal to 15 cm.

the width of the protective conductive track is between 1 and 20 cm, preferably between 2.5 and 15 cm, in particular equal to 4 cm.

the protective conductive track is at the surface level of the roadway.

the live and neutral conductive tracks are between 0 and 5 mm above the surface level of the roadway, in particular 2 mm above the surface of the roadway.

the system is designed to power a non-guided electric vehicle equipped with means for capturing the current able, during the movement of the vehicle on the roadway, to be placed in sliding contact on the two live and neutral conductive tracks, simultaneously.

BRIEF DESCRIPTION OF THE FIGURES

The invention will be better understood upon reading the following description of one particular embodiment, provided solely as an illustration and non-limitingly, and done in reference to the appended drawings, in which.

DETAILED DESCRIPTION

Backed by its experience in the field of ground level power supply systems, of the type using conduction, for guided electric vehicles, i.e., vehicles forced to move along tracks (in particular tramways moving along railroad tracks), the applicant has developed this ground level power supply system for non-guided electric vehicles.

Figure 1:
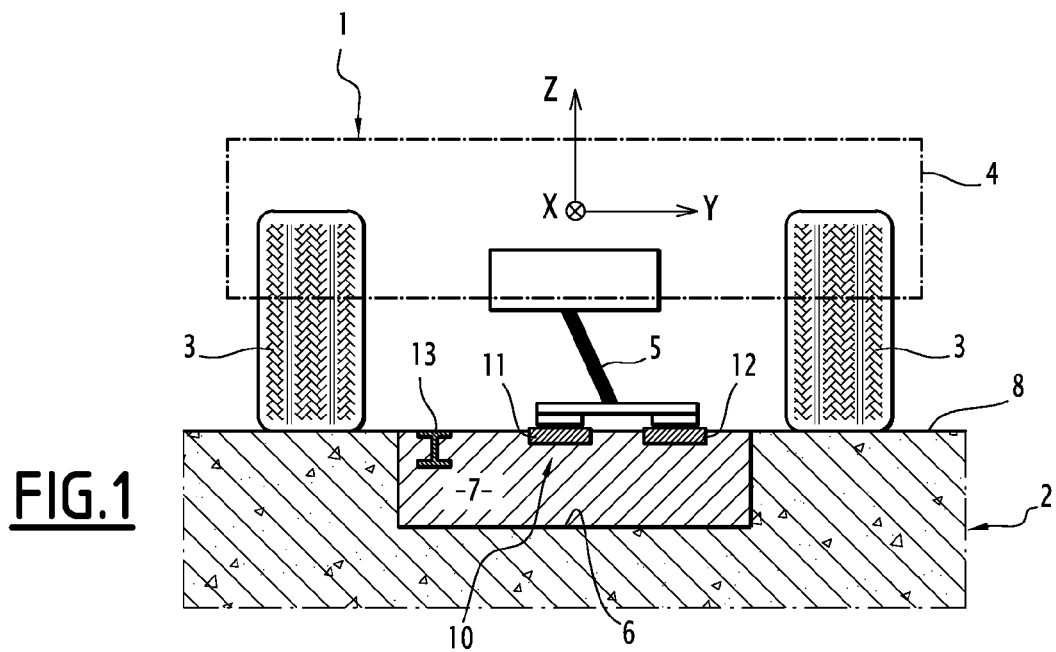
FIG. 1 is a back view diagrammatically showing a non-guided electric vehicle traveling on a roadway equipped with the ground level power supply system according to the invention.
Figure 2:
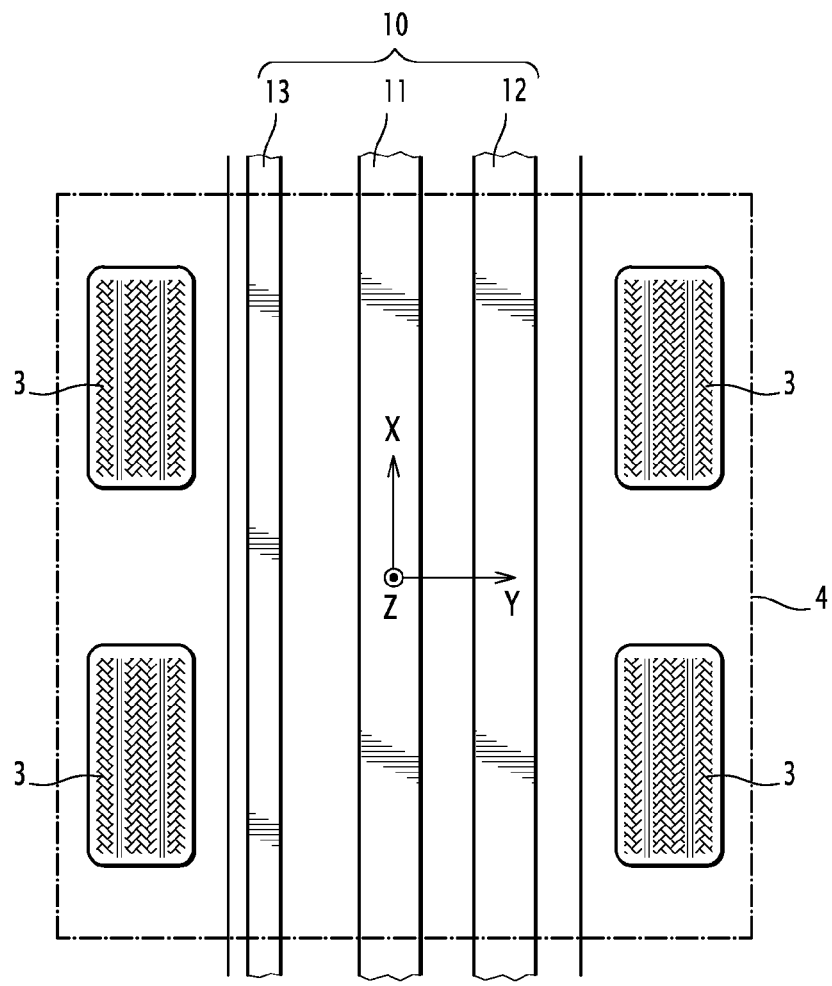
FIG. 2 is a top view of FIG. 1.

FIGS. 1 and 2 show a car 1, as a non-guided electric vehicle, traveling on a roadway 2.

A reference trihedron XYZ is traditionally associated with the car 1: the axis X in the longitudinal direction, oriented toward the front; the axis Y in the transverse direction, oriented from left to right; and the axis Z in the vertical direction, oriented from bottom to top.

The car 1 comprises a body 4 and wheels 3, some of which are drive wheels. The car 1 comprises steering means (not shown) allowing the driver to modify the angle of the drive wheels in the plane XY so as to steer the vehicle 1.

The car 1 comprises a rechargeable battery and an electric motor (not shown).

The car 1 is equipped with capture means making it possible to collect electricity during the movement of the car 1. The capture means are generally referenced by number 5.

The capture means 5 comprise a pad able to be placed in sliding contact on a pair of power supply tracks of the ground level power supply system, which will now be described.

The roadway 2 comprises a trench 6 inside which the ground level power supply system is positioned, generally referenced by number 10.

Once the system 10 is positioned in the trench 6, the latter is filled with concrete 7 such that the upper surface 8 of the roadway 2 is continuous over the entire width thereof. The upper surface 8 is substantially planar.

In position, the system 10 has, flush with the surface 8 of the roadway 2:
- a live conductive track 11, designed to be electrically connected to an electricity source, for example delivering a potential $V_s$ of +750 V DC;
- a neutral conductive track 12, designed to be electrically connected to a reference potential $V_{ref}$, for example 0 V;
- a protective conductive track 13, designed to be electrically connected to a ground potential $V_{earth}$.

The live track 11 is made up of a plurality of segments (11.i in FIG. 4) which, in the embodiment currently considered, each have a width of 10 cm and a length of 20 m.

The segments are positioned end-to-end to make up the live track 11.

The segments are electrically insulated from one another.

Advantageously, the neutral track 12 is made by using segments identical to those used for the live track 11. Thus, the track 12 is made up of a plurality of segments (12.i in FIG. 4) having a width of approximately 10 cm and a length of approximately 20 m. It is not, however, necessary for the segments of the neutral track to be electrically insulated from one another.

The neutral track 12 travels parallel to the live track 11, on a first side thereof. The lateral edge of the live track 11 and the lateral edge of the neutral track 12, which are across from one another, are separated by a first distance of approximately 15 cm.

The protective track 13 is formed by the upper face of a profile 14 sealed in concrete 7 filling the trench 6.

In the currently preferred embodiment, the profile 14 has an I-shaped section, the central core of which is positioned substantially vertically.

The function of the protective track 13 is to make up means for collecting electrons of a leak current coming from the live conductive track 11.

To that end, the protective track 13 is positioned parallel to the live track 11, on a second side thereof. That second side is opposite the first side of the live track 11 comprising the neutral track 12.

The leak currents toward the first side are collected by the neutral track 12. In order to collect the current leaks toward the second side, the protective track 13 is placed on the second side of the live track 11.

The lateral edge of the live track 11 and the lateral edge of the protective track 13, which are across from one another, are separated by a second distance of approximately 15 cm.

In the considered embodiment, the width of the protective track 13 is approximately 4 cm.

With this particular choice of values for the transverse dimensions of the different tracks and their mutual spacing, the ground level power supply system 10 has a total width of approximately 54 cm. This total width is chosen to remain lower than the center distance of the smallest non-guided electric vehicle that may travel on the roadway 2 and use the system 10.

Figure 3:
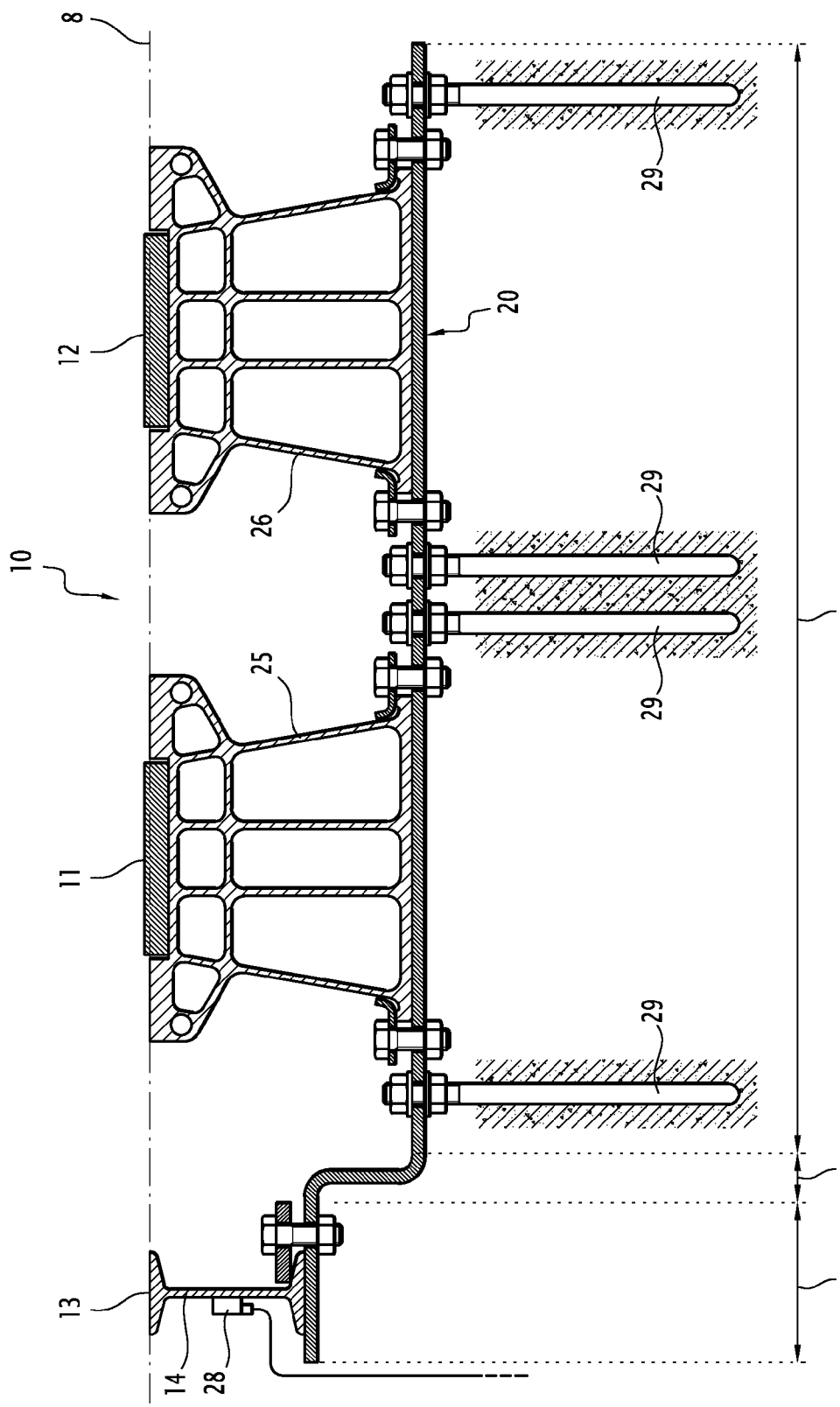
FIG. 3 is a cross-section of the ground level power supply system of FIGS. 1 and 2, ready to be installed in the roadway.

As shown in FIG. 3, to facilitate the placement of the system 10, the latter comprises a support assembly for the different tracks.

The support assembly comprises a base 20 having a main portion 21, which is substantially planar, an S-shaped intermediate portion 22, and a substantially planar lateral portion 23.

The main portion 21 has two support profiles 25 and 26, identical to each other, and designed to serve as an insulating support respectively for the live conductor track 11 and the neutral conductor track 12. The tracks are mechanically fastened on the support profiles, but are electrically insulated from the latter.

The support profiles 25 and 26 are mechanically and electrically connected to the base 20.

The lateral portion 23 of the base 20 supports the profile 14.

A level difference between the main 21 and lateral 23 portions is adjusted using the intermediate portion 22 so that the upper surface of the profile 14, defining the protective track 13, is at the same level as the upper surfaces of the live 11 and neutral 12 tracks. This level is designed to be situated slightly above the surface 8 of the roadway 2.

An electric cable 28, fastened to the core of the profile 14, is designed to be buried in the roadway 2, advantageously beyond the trench 6, so as to position the protective track 13 at the ground potential $V_{earth}$, and by electric continuity, the support assembly.

The base 20 is provided with a plurality of connecting rods 29, the height of which is adjustable, which can be plugged into the bottom of the trench 6 so as to pre-position the ground level power supply system 10 such that the level of the tracks is flush with the surface 8 of the roadway 2 to be produced.

Then, concrete is poured so as to embed the support assembly. The support profiles 25 and 26 as well as the profile 14 are then sealed in the layer of concrete 7. Advantageously, the state of the upper surface of the concrete layer is worked to have an adherence adapted to the tires of the vehicles traveling on the roadway 2.

The pair of power supply tracks, made up of the live track 11 and the neutral track 12, as well as the protective track 13, are flush with the surface 8 of the roadway 2. More specifically, although the protective track 13 is substantially at the roadway level, the neutral and live tracks protrude slightly above the surface 8 of the roadway 2, for example by a height of several millimeters, in particular equal to 2 mm.

Thus, when the live track 11 is brought to a high potential, any leak current, for example due to the presence of a puddle or a film of water on the surface 8 of the roadway, is collected on the first side by the neutral track 12 and on the second side by the protective track 13. This prevents the portion of the roadway surface brought to a high potential from extending laterally beyond the width of the ground level power supply system 10. By choosing the total width of the ground level power supply system 10 to be smaller than the center distance of the smallest vehicle authorized to travel on the roadway and able to use the system 10, it is guaranteed that if a pedestrian is laterally on the first or second side of a segment of the live track 11, but past either the neutral track or the protective track, the pedestrian will not be electrocuted when that segment is brought to a high potential.

Figure 4:
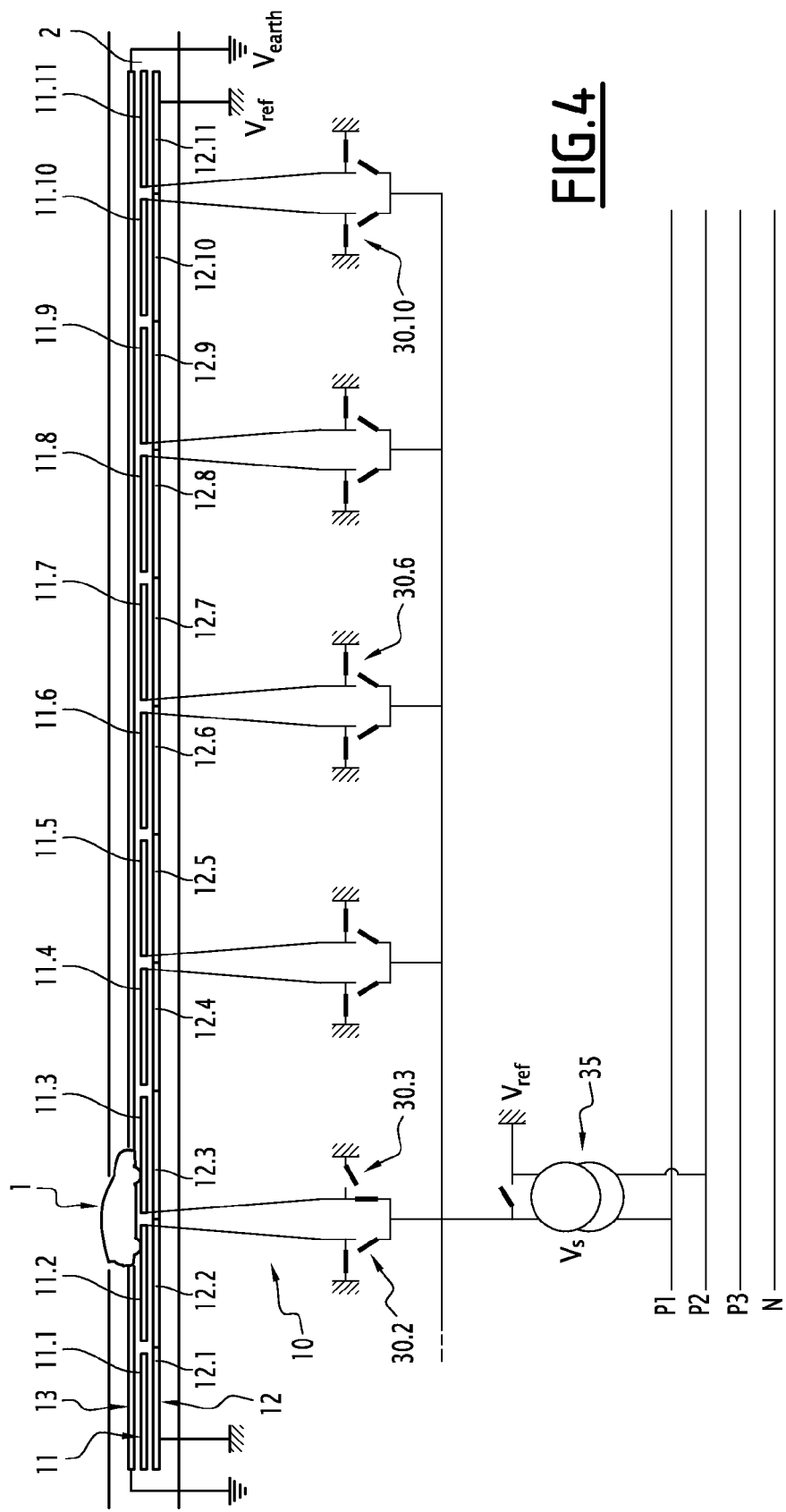
FIG. 4 is a diagrammatic illustration of the electric operation of the ground level power supply system according to the invention.

In reference now to FIG. 4, each segment 11.$i$ of the live track 11 is electrically connected, via a controlled switch 30, to an electric power source 35. The source 35 is for example able to deliver a voltage $V_s$ of 750 V DC. The source 35 is in fact a relay station able to convert a three-live current into a two-live current.

The controlled switches 30.$i$ of the segments 11.$i$ of the live track 11 are actuated to switch, synchronized with the movement of the car 1 along the roadway 2, such that the segment past which the car 1 is located and optionally the adjacent segments are connected to the source 35 to be brought to the potential of 750 V.

The collecting means 5 of the car 1 simultaneously rub on the live 11 and neutral 12 tracks, allowing the flow of a power supply current to the rechargeable battery of the car 1 or its electric engine.

The segments 11.$i$ are powered successively, such that a segment or optionally two segments are at the potential of 750 V at a given moment. Thus, the portion of the roadway surface brought to a potential dangerous for pedestrians does not extend longitudinally past the length of one segment, or two segments at most. That is why the length of the segments is chosen to correspond substantially to the braking distance of a private car traveling at 60 km/h.

The invention claimed is:

1. A ground level power supply system for non-guided electric vehicles, of the conduction type, comprising:
    a pair of power supply tracks, comprising a live conductive track, designed to be electrically connected to a voltage source, and a neutral conductive track, for the return of the current, designed to be electrically connected to a reference potential, the neutral track traveling parallel to the live track on a first side thereof; and
    a protective conductive track, designed to be connected to a ground potential, the protective track traveling parallel to the live track on a second side thereof, opposite the first side;
    the live, neutral and protective conductive tracks being supported on a support assembly designed to be embedded below the surface of the roadway;
    said system being designed to be installed in a roadway such that the live, neutral and protective conductive tracks are flush with a surface of the roadway.

2. The system according to claim 1, wherein the protective conductive track is electrically connected to a wire designed to be buried in the roadway, so as to place said protective conductive track at the ground potential.

3. The system according to claim 1, wherein the live conductive track is made up of a plurality of elongated segments, arranged end to end and electrically isolated from one another.

4. The system according to claim 3, wherein each segment is electrically connected to an electric power source by a controlled switch.

5. The system according to claim 1, wherein the protective conductive track is made up of an upper surface of a profile sealed in the roadway.

6. The system according to claim 1, wherein the neutral conductive track is made up of a plurality of elongated segments, positioned end to end, and electrically connected to the reference potential.

7. The system according to claim 1, wherein the protective conductive track is at a distance from the live conductive track between 5 and 50 cm, preferably between 10 and 30 cm, in particular equal to 15 cm.

8. The system according to claim 1, wherein the width of the protective conductive track is between 1 and 20 cm, preferably between 2.5 and 15 cm, in particular equal to 4 cm.

9. The system according to claim 1, wherein the protective conductive track is at the surface of the roadway.

10. The system according to claim 1, wherein the live and neutral conductive tracks are between 0 and 5 mm above the surface level of the roadway, in particular 2 mm above the surface of the roadway.

11. The system according to claim 1, designed to power a non-guided electric vehicle equipped with means for capturing the current able, during the movement of the vehicle on the roadway, to be placed in sliding contact on the two live and neutral conductive tracks, simultaneously.

* * * * *